(12) United States Patent
Wittebrood et al.

(10) Patent No.: US 6,796,484 B2
(45) Date of Patent: Sep. 28, 2004

(54) NICKEL-PLATED BRAZING PRODUCT HAVING IMPROVED CORROSION PERFORMANCE

(75) Inventors: Adrianus Jacobus Wittebrood, Velserbroek (NL); Jacques Hubert Olga Joseph, Amsterdam (NL); Joop Nicolaas Mooij, Castricum (NL)

(73) Assignee: Corus Aluminum Walzprodukte GmbH, Koblenz (DE)

(*) Notice: Subject to any disclaimer, the term of this patent is extended or adjusted under 35 U.S.C. 154(b) by 231 days.

(21) Appl. No.: 10/060,117

(22) Filed: Jan. 31, 2002

(65) Prior Publication Data

US 2002/0175205 A1 Nov. 28, 2002

Related U.S. Application Data

(60) Provisional application No. 60/293,986, filed on May 30, 2001.

(30) Foreign Application Priority Data

Feb. 2, 2001 (EP) .............................................. 01200400
May 29, 2001 (EP) .............................................. 01202025

(51) Int. Cl.⁷ ......................... B23K 35/38; B23K 35/12
(52) U.S. Cl. .................. 228/249; 228/262.51; 428/650; 428/654
(58) Field of Search .................... 428/652, 937, 428/654, 658, 650, 648; 228/249, 212.51

(56) References Cited

U.S. PATENT DOCUMENTS

| 2,745,799 A | 5/1956 | Patrie |
| 2,821,014 A | 1/1958 | Miller |
| 2,821,505 A | 1/1958 | Beach |

(List continued on next page.)

FOREIGN PATENT DOCUMENTS

| DE | 3821073 | 1/1989 |
| EP | 0227261 | 7/1987 |
| FR | 2354171 | 1/1978 |
| FR | 2617868 | 1/1989 |

(List continued on next page.)

OTHER PUBLICATIONS

WO 00/71784 A2; Mooij et al; Nov. 20, 2000.*
US Pat. App. Pub. No. US 2003/0098338 (Ser. No. 09/990,507), filed Nov. 21, 2001, Dockus et al.
US Pat. App. Pub. No. US 2002/0088717 (Ser. No. 09/984,968), filed Oct. 31, 2001, Wittebrood et al.

(List continued on next page.)

Primary Examiner—Tom Dunn
Assistant Examiner—Colleen P. Cooke
(74) Attorney, Agent, or Firm—Stevens, Davis, Miller & Mosher, LLP

(57) ABSTRACT

A brazing product, e.g. a brazing sheet product, having an aluminium layer made of an aluminium alloy comprising silicon in an amount in the range of 2 to 18 weight %, and a layer comprising nickel on the outer surface of the aluminium layer such that taken together the aluminium layer and all layers exterior thereto form the filler metal for a brazing operation. The filler metal has a composition containing at least one element: (i) with a smaller exchange current density for the Hydrogen Evolution Reaction ("HER") than nickel and/or (ii) such that the electrochemical potential difference between particles of Ni-aluminide(s) of the filler and the aluminium alloy matrix of the filler is reduced. The filler metal's mol-ratio of Ni to such element(s) is in the range of 10:(0.3–30). The invention also relates to a method of manufacturing a brazed assembly using the brazing product, and to a brazed assembly comprising at least one component made of the brazing product.

44 Claims, 1 Drawing Sheet

| 4 |
| 3 |
| 2 |
| 6 |
| 1 |
| 5 |
| 1 |
| 6 |
| 2 |
| 3 |
| 4 |

U.S. PATENT DOCUMENTS

| | | | |
|---|---|---|---|
| 3,482,305 A | 12/1969 | Dockus et al. | |
| 3,489,657 A | 1/1970 | Brenan et al. | |
| 3,597,658 A | 8/1971 | Rivera | |
| 3,963,454 A | 6/1976 | Singleton, Jr. | |
| 3,970,237 A | 7/1976 | Dockus | |
| 4,028,200 A | 6/1977 | Dockus | |
| 4,157,154 A | 6/1979 | Scott et al. | |
| 4,164,454 A | 8/1979 | Schober | |
| 4,388,159 A | 6/1983 | Dockus et al. | |
| 4,602,731 A | 7/1986 | Dockus | |
| 4,721,653 A | 1/1988 | Oda et al. | |
| 4,741,811 A | 5/1988 | Lefebvre et al. | |
| 5,069,980 A | 12/1991 | Namba et al. | |
| 5,234,574 A | 8/1993 | Tsuji et al. | |
| 5,245,847 A | 9/1993 | Bando et al. | |
| 5,422,191 A | 6/1995 | Childree | |
| 5,466,360 A | 11/1995 | Ehrsam et al. | |
| 5,601,695 A | 2/1997 | Muranushi | |
| 5,643,434 A | 7/1997 | Benmalek et al. | |
| 5,961,853 A * | 10/1999 | Thornton | 219/85.14 |
| 6,060,174 A | 5/2000 | Sabol | |
| 6,129,262 A | 10/2000 | Cooper et al. | |
| 6,379,818 B1 * | 4/2002 | Mooij et al. | 428/648 |
| 6,383,661 B2 | 5/2002 | Wittebrood et al. | |
| 6,391,476 B2 | 5/2002 | Wittebrood et al. | |
| 6,503,640 B2 | 1/2003 | Wittebrood et al. | |
| 6,568,584 B2 * | 5/2003 | Wittebrood et al. | 228/219 |

FOREIGN PATENT DOCUMENTS

| | | |
|---|---|---|
| GB | 1176688 | 1/1970 |
| WO | 0071781 | 11/2000 |
| WO | 0071784 | 11/2000 |
| WO | 0168312 | 9/2001 |
| WO | 0188226 | 11/2001 |
| WO | 0238326 | 5/2002 |
| WO | 02060639 | 8/2002 |
| WO | 03043777 | 5/2003 |
| WO | 03045618 | 6/2003 |
| WO | 03045619 | 6/2003 |

OTHER PUBLICATIONS

US Pat. App. Pub. No. US 2003/0064242 (Ser. No. 10/230,429), filed Aug. 29, 2002, Wittebrood et al.

US Pat. App. Pub. No. US 2003/0091856 (Ser. No. 10/042,752), filed Dec. 20, 2002, Wittebrood et al.

US Pat. App. Pub. No. US 2003/0042146 (Ser. No. 10/125,583), filed Apr. 19, 2002, Wijenberg et al.

US Pat. App. Pub. No. US 2003/0098338 (Ser. No. 09/990,507), filed Nov. 21, 2001, Dockus et al.

Bureau of Mines Technology, "Aluminium Soft–Soldering", 2301 N.T.I.S. Tech Notes (manufacturing), XP–002119816, 1985, Jan. No. 1G, Springfield, VA, pp. 12–13.

Wernick and Pinner, "The Surface Treatment and Finishing of Aluminium and its Alloys", $5^{th}$ edition, vol. 1, pp. 181–182 and pp. 191–203 (1988).

Wernick and Pinner, "The Surface Treatment and Finishing of Aluminium and its Alloys", $5^{th}$ edition, vol. 2, pp. 1006–1022 and pp. 1023–1071 (Ch. 14–15)(Nov. 1988).

SAE Paper No. 880446 by B.E. Cheadle and K.F. Dockus, "Inert Atmosphere Fluxless Brazing of Aluminum Heat Exchangers", ICE, Detroit, Michigan, pp. 1–11 (Feb. 29–Mar. 4, 1988).

Adrianus Jacobus Wittebrood, Jacques Hubert Olga Joseph Wijenberg, Joop Nicolaas Mooij, "Nickel–Plated Aluminum Brazing Sheet" Research Disclosure, No. 439, pp. 1946–1947 (Nov. 2000).

SAE Paper No. P–263 by Kent Schölin and Bo Mannerskog, "Corrosion Resistant Aluminium Radiator Materials for Vacuum and Controlled Atmosphere Brazing" pp. 75–82, 1993 Vehicle Thermal Management Systems Conference Proceedings.

Greef, N. et al, "The Hydrogen Evolution Reaction", Instrumental Methods in Electrochemistry, pp. 233–236 (1990).

U.S. patent application Ser. No. 09/573,980, Filed May 19, 2000, Joop Nicolaas Mooij et al.

U.S. patent application Ser. No. 09/801,840, Filed Mar. 9, 2001, Adrianus Jacobus Wittebrood et al.

U.S. patent application Ser. No. 09/849,238, Filed May 7, 2001, Adrianus Jacobus Wittebrood et al.

U.S. patent application Ser. No. 09/984,968, Filed Oct. 31, 2001, Adrianus Jacobus Wittebrood et al.

U.S. patent application Ser. No. 09/985,945, Filed Nov. 6, 2001, Adrianus Jacobus Wittebrood et al.

U.S. patent applicatio Ser. No. 09/986,475, Filed Nov. 8, 2001, Adrianus Jacobus Wittebrood ASTM G–85 (1990).

U.S. Published patent application No. 2003/0155409, (Ser. No. 10/300,836), Dockus et al., filed Nov. 21, 2002, published Aug. 12, 2003.

U.S. patent application Ser. No. 10/621,601, Wijenberg et al., filed Jul. 18, 2003 (unpublished).

U.S. patent application Ser. No. 10/622,122, Wijenberg et al., filed Jul. 18, 2003 (unpublished).

* cited by examiner

| 4 |
|---|
| 3 |
| 2 |
| 6 |
| 1 |
| 5 |
| 1 |
| 6 |
| 2 |
| 3 |
| 4 |

NICKEL-PLATED BRAZING PRODUCT HAVING IMPROVED CORROSION PERFORMANCE

This claims priority from U.S. provisional patent application serial No. 60/293,986 filed May 30, 2001, incorporated herein by reference in its entirety.

FIELD OF THE INVENTION

The invention relates to a brazing product, such as a brazing sheet product, having an aluminium layer being made of an aluminium alloy comprising silicon in an amount in the range of 2 to 18% by weight, and a further layer comprising nickel on the outer surface of the AlSi-alloy layer such that taken together the aluminium layer and all layers exterior thereto form a filler metal for a brazing operation. The invention also relates to a method of manufacturing a brazed assembly using the brazing product, and to a brazed assembly comprising at least one component made of the brazing product.

DESCRIPTION OF THE RELATED ART

Aluminium and aluminium alloys can be joined by a wide variety of brazing and soldering processes. Brazing, by definition, employs filler metal having a liquidus above 450° C. and below the solidus of the base metal. Brazing is distinguished from soldering by the melting point of the filler metal: solders melt below 450° C. Soldering processes are not within the field of the present invention.

Brazing products, and in particular brazing sheet products, find wide applications in heat exchangers and other similar equipment. Conventional brazing sheet products having a core sheet, typically an aluminium alloy of the Aluminium Association (AA)3xxx-series, having on at least one surface of the core sheet clad an aluminium clad layer, the aluminium clad layer being made of an AA4xxx-series alloy comprising silicon in an amount in the range of 2 to 18% by weight, and preferably in the range of 7 to 14% by weight. The aluminium clad layer may be coupled to the core alloy in various ways known in the art, for example by means of roll bonding, cladding, explosive cladding, thermal spray-forming or semi-continuous or continuous casting processes.

Controlled Atmosphere Brazing ("CAB") and Vacuum Brazing ("VB") are the two main processes used for industrial scale aluminium brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the oxide layer present is mainly caused by the evaporation of magnesium from the clad alloy. There is always more magnesium present in the furnace than necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. CAB is essentially a continuous process in which, if the proper brazing flux is being used, high volumes of brazed assemblies can be manufactured. The brazing flux dissolves the oxide layer at brazing temperature allowing the clad alloy to flow properly. When the NOCOLOK flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminium surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the known brazing flux application. Such a material can be supplied to a manufacturer of brazed assemblies and is ready to use directly after forming of the assembly parts. No additional brazing fluxing operations have to be carried out. Presently, only one process for flux-less brazing is used on an industrial scale. The material for this process can be for example standard brazing sheet made from an AA3xxx-series core alloy clad on both sides with a cladding of an AA4xxx-series alloy. Before the brazing sheet can be used the surface has to be modified in such a way that the naturally occurring oxide layer does not interfere during the brazing cycle. The method of achieving good brazing is to deposit a specific amount of nickel on the surface of the clad alloy. If properly applied, the nickel reacts, presumably exothermically, with the underlying aluminium. The nickel can be applied by using a shim of nickel between the two parts to be joined or can be deposited by electroplating. When electroplating is used the adherence of the nickel should be sufficient to withstand typical shaping operations being used in for example heat exchanger manufacture.

Processes for nickel-plating in an alkaline solution of aluminium brazing sheet are known from each of U.S. Pat. No. 3,970,237, 4,028,200, 4,164,454, and SAE-paper no. 880446 by B. E. Cheadle and K. F. Dockus. According to these documents, nickel or cobalt, or combinations thereof, are most preferably deposited in combination with lead. The lead addition is used to improve the wetability of the aluminium clad alloy during the brazing cycle. An important characteristic of these plating processes is that the nickel is preferentially deposited on the silicon particles of the aluminium clad alloy. To obtain sufficient nickel for brazing, the surface of the aluminium clad alloy should contain a relatively large number of silicon particles to act as nuclei for the nickel deposition. It is believed that to obtain sufficient nucleation sites a part of the aluminium in which the silicon particles are embedded should be removed by before pickling chemical and/or mechanical pretreatment. This is believed a necessary condition to obtain sufficient nickel coverage to serve as nuclei for the plating action of the brazing or clad alloy. On a microscopic scale the surface of the Si-containing cladding of the brazing sheet is covered with nickel globules. However, the use of lead for the production of a suitable nickel and/or cobalt layer on brazing sheet has several disadvantages. The use of lead for manufacturing products, such as automotive products, is undesirable and it is envisaged that in the very near future there might possibly even be a ban on lead comprising products or products manufactured via one or more intermediate processing steps comprising lead or lead-based components.

In the international PCT patent application no. WO-00/71784, incorporated herein by reference, J. N. Mooij et al. disclose a brazing sheet product and a method of its manufacture. In this brazing sheet product there is provided a bonding layer comprising zinc or tin between the AlSi-alloy clad layer and the nickel layer in order to improve the bonding of the nickel layer. The addition of lead to the nickel layer has been replaced by the addition of bismuth while maintaining the excellent brazeability characteristics of the brazing sheet product.

A drawback of the known brazing sheet products having a layer comprising nickel is the limited corrosion life of brazed products in a SWAAT-test in accordance with ASTM G-85. Corrosion lifetimes without perforations are typically in the range of 5 to 7 days. For several applications of the known nickel-plated brazing sheet in brazed products such a relatively short corrosion lifetime is not detrimental. However, a good corrosion resistance is an important property for brazing products used in heat exchangers, such as radiators, condensers and oil coolers. These heat exchangers are exposed to a severe external corrosive attack by, e.g., de-icing road salt. Long-life alloys are considered herein as those, which in the SWAAT-test without perforations according to ASTM G-85 exceed 10–12 days (see e.g. K. Scholin et al., VTMS 1993, SAE P-263).

SUMMARY OF THE INVENTION

It is an object of the present invention to provide a Ni-plated brazing product for use in a brazing operation, ideally a CAB brazing operation, and wherein the brazing product has an improved post-braze corrosion resistance when measured in a SWAAT-test in accordance with ASTM G-85 (which for purposes of this disclosure is the version of year 1990).

It is another object of the present invention to provide a brazing sheet product having a core sheet made of an aluminium alloy coupled on at least one surface of the core sheet to an aluminium clad layer, the aluminium clad layer being made of an aluminium alloy comprising silicon in an amount in the range of 2 to 18% by weight, and a further layer comprising nickel on the outer surface of the aluminium clad layer such that taken together the aluminium clad layer and all layers exterior thereto form a filler metal for a brazing operation, and wherein the brazing sheet product has an improved corrosion resistance when measured in a SWAAT-test in accordance with ASTM G-85.

It is another object of the present invention to provide a brazing product, ideally a brazing sheet product, having had a corrosion life of 12 days or more in a SWAAT-test without perforations in accordance with ASTM G-85.

It is another object of the present invention to provide a method of manufacturing brazed assemblies using the brazing product.

A brazing product, e.g. a brazing sheet product, having an aluminium layer made of an aluminium alloy comprising silicon in an amount in the range of 2 to 18 weight %, and a layer comprising nickel on the outer surface of the aluminium layer such that taken together the aluminium layer and all layers exterior thereto form the filler metal for a brazing operation. The filler metal has a composition containing at least one element: (i) with a smaller exchange current density for the Hydrogen Evolution Reaction ("HER") than nickel and/or (ii) such that the electrochemical potential difference between particles of Ni-aluminide(s) of the filler and the aluminium alloy matrix of the filler is reduced. The filler metal's mol-ratio of Ni to such element(s) is in the range of 10:(0.3–30). The invention also relates to a method of manufacturing a brazed assembly using the brazing product, and to a brazed assembly comprising at least one component made of the brazing product.

BRIEF DESCRIPTION OF THE DRAWING

The sole FIGURE schematically shows an embodiment of a brazing sheet of the present invention.

DETAILED DESCRIPTION OF THE PREFERRED EMBODIMENTS

In accordance with the invention in one aspect there is provided a brazing product having an aluminium clad layer being made of an aluminium alloy comprising silicon in an amount in the range of 2 to 18% by weight, preferably 7 to 14%, and a layer comprising nickel on the outer surface of the AlSi-alloy layer such that taken together the AlSi-alloy layer and all layers exterior thereto form the filler metal for a brazing operation. This product is characterised in that the filler metal has a composition further comprising at least one element with a smaller exchange current density for the Hydrogen Evolution Reaction ("HER") than nickel, and whereby the mol-ratio of Ni to such element or elements is in the range of 10:(0.3 to 30).

By the addition of the alloying elements to the filler metal in the appropriate mol-ratio an improved corrosion performance is being obtained of the product in a post-braze condition. In the brazing product according to the invention corrosion lifetimes without perforations according to ASTM G-85 exceed 8 days. By selection of the mol-ratios a corrosion life of more than 12 days can be obtained, resulting in that the desired long-life properties are being achieved. In the best examples a corrosion life without perforations of more than 20 days has been reached. The product can be fluxless brazed under controlled atmosphere conditions while achieving very good corrosion performance enhancing the possibilities of application of the Ni-plated brazing product.

The invention is based in part on the insight that it is believed that the cathodic reaction governs the overall corrosion rate of Ni-plated brazing products when tested in the SWAAT-test. The cathodic reaction in this system appears to be the Hydrogen Evolution Reaction ("HER"). When nickel plated brazing products such as brazing sheets are being subjected to brazing operations, typically a fluxless CAB operation, small Ni-aluminide particles are being formed which are believed to catalyse the HER. By the addition of one or more elements in a sufficient amount to the metal filler and having a lower exchange current density for the HER as compared to nickel-aluminides the catalytic effect is reduced and the corrosion performance of the brazed product is improved remarkably.

From the textbook "Instrumental Methods in Electrochemistry", Southampton Electrochemistry Group, Ellis Horwood Limited, 1990, Table 7.1 several exchange current densities as given for the HER in 1M $H_2SO_4$, for example as shown in present TABLE A:

TABLE A

| Element | $-\log i_0/A\ cm^{-2}$ |
|---|---|
| Ni | 5.2 |
| Bi | 7.8 |
| In | 9.5 |
| Sn | 8.0 |
| Zn | 10.5 |

Various alloying elements in an aluminium alloy may be used for the purpose of improving the corrosion performance of the brazing products in the post-braze condition. The most practical elements, taking into account that such elements have to be added to the aluminium clad layer, and/or to the Ni comprising layer, and/or as at least one separately applied layer as metal or alloy, are elements selected from the group comprising tin, bismuth, zinc, silver, indium, lead, cadmium, antimony, magnesium and gallium.

A more preferred lower-limit for the mol-ratio of Ni to such alloying element or elements is 10:0.5, thereby improving the corrosion life of the brazed product. When the mol-ratio is too low no significant effect on the corrosion life may be found. A more suitable upper-limit for the mol-ratio of Ni to such alloying element or elements is 10:20, and preferably 10:15, and more preferably 10:9. Thereby improving the corrosion life of the brazed product.

In another aspect of the invention there is provided a brazing product having an aluminium layer being made of an aluminium alloy comprising silicon in an amount in the range of 2 to 18% by weight, and a layer comprising nickel or nickel-alloy on the outer surface of the aluminium layer such that taken together the aluminium layer and all layers exterior thereto form the filler metal for a brazing operation. This product is characterised in that the filler metal has a composition containing at least one element having an electro-chemical potential such that the electro-chemical potential difference between Ni-aluminides particles and the aluminium alloy matrix of the brazed filler is reduced, and whereby the mol-ratio of Ni to such element(s) is in the range of 10: (0.3 to 30). The reduction in electro-chemical potential is made against the known Ni-plated brazing product having a AlSi clad layer, e.g. AA4045 alloy, having no other alloying elements other than silicon, and further having a layer of Ni, Ni—Pb or Ni—Bi alloy.

By the addition of the alloying elements to the filler metal in the appropriate mol-ratio an improved corrosion performance of the product is being obtained in a post-braze condition. In the brazing product according to the invention corrosion lifetimes without perforations according to ASTM G-85 exceed 8 days. By a selection of the mol-ratios a corrosion life of more than 12 days can be obtained, resulting in that the desired long-life properties are being achieved. In the best examples a corrosion life without perforations of more than 20 days has been reached. The product can be fluxless brazed under controlled atmosphere conditions while achieving very good corrosion performance enhancing the possibilities of application of this Ni-plated brazing product.

This aspect of the invention is based in part on the insight that the electro-chemical potential difference between Ni-aluminides particles formed during a brazing operation in the filler metal and the surrounding aluminium alloy matrix is too large and results in poor corrosion performance of the brazed product when tested in the SWAAT-test. For this invention the term Ni-aluminides particles is used to denote $Al_xNi_y$-particles such as for example $NiAl_3$, $Al_6Ni_3Si$, and $Al_2Ni_2Si$. This potential difference could be reduced by the addition of one or more alloying elements to the filler metal resulting in an improved corrosion life. Several alloying elements may be used for this purpose, but notably copper as an alloying element may be used successfully for this purpose.

A more preferred lower-limit for the mol-ratio of Ni to such alloying element or elements is 10:0.5, to thereby improve the corrosion life of the brazed product. When the mol-ratio is too low no significant effect on the corrosion life may be found. A more suitable upper-limit for the mol-ratio of Ni to such alloying element or elements is 10:20, and preferably 10:15, and more preferably 10:9. Thereby improving the corrosion life of the brazed product. When the mol-ratio is too large the corrosion life in a SWAAT-test may even be adversely affected.

In the embodiment where copper is being used to improve the corrosion life of the nickel-plated brazing product, the mol-ratio of Ni:Cu in the filler metal is preferably in the range of 10:(0.5 to 9), and more preferably in the range of 10:(0.5 to 5). It has been found that the addition of too high amounts of Cu to the filler metal has a strong adverse affect on the corrosion life-time of the brazing product. In addition high amounts of Cu may result in the reduction of the melting temperature of the filler metal. Typically, the copper is applied as a separately applied layer for example on top of the outer surface of the nickel comprising layer. Typically the copper is applied as a plated layer or a thermal sprayed layer.

In the embodiment where tin is being used to improve the corrosion life of the nickel-plated brazing product, the mol-ratio of Ni:Sn in the filler metal is preferably in the range of 10:(0.5 to 9), and more preferably in the range of 10:(0.5 to 6). The addition of tin, preferably as a seperately applied layer for example on top of the outer surface of the nickel comprising layer, may lead to a post-braze corrosion life of more than 12 days without perforations in the SWAAT-test according to ASTM G-85, and in the best examples even 20 days or more without perforations. A further advantage of having a separately applied tin layer on top of the applied nickel comprising layer is that the tin may work as a solid but soft lubricant in forming operations of the brazing product prior to adding it is an assembly. When too much tin is present in the filler metal the brazeability of the product is adversely affected.

In the embodiment where zinc is being used to improve the corrosion life of the nickel-plated brazing product, the mol-ratio of Ni:Zn in the filler metal is preferably in the range of 10:(0.5 to 15), and more preferably in the range of 10:(0.5 to 8). The addition of zinc, preferably as a separately applied layer for example on top of the outer surface of the nickel comprising layer or added to the AlSi alloy clad layer, may lead to a post-braze corrosion life of more than 10 days without perforations in the SWAAT-test according to ASTM G-85, and in the best examples even 15 days or more without perforations. A further advantage of having a seperately applied zinc layer on top of the applied nickel comprising layer is that the zinc may work as a solid lubricant for forming operations of the brazing product prior to adding it is an assembly.

A preferred embodiment of the brazing product in accordance with the invention is characterised in that one or more separate layers, comprising one or more of the elements in an amount such that in the filler metal the mol-ratio of Ni to the element(s) is in the range of 10: (0.3 to 30), are deposited by plating, preferably by means of electroplating. However, other techniques such as roll bonding, thermal dipping, thermal spraying, plasma spraying, Chemical Vapour Deposition ("CVD") and Physical Vapour Deposition ("PVD") or other techniques for depositing of metals or metal alloys from a gas or vapor phase may be used. Additional plated metal layers can be applied in an industrial scale plating line. It has been found that the thin separate metal layers have no detrimental effect on the adhesion of the nickel comprising layer. Furthermore, it has been found that such separate metal layers melt very easily and fast and do not adversely affect the brazeability of the brazing product. Furthermore, such layers are sufficiently resistant to the formation of oxide formation during the heating up in a brazing cycle.

The sole FIGURE shows an embodiment of a brazing sheet of the present invention comprising a core sheet 5 made of an aluminum alloy, respective aluminum alloy clad layers 1 coupled to each surface of the core sheet 5, intermediate bonding layers 6 comprising tin or zinc, layers comprising nickel 2 on the outer surface of each aluminum alloy clad layer 1, and separately applied layers 3, 4 providing at least one element with a smaller exchange current density for the Hydrogen Evolution Reaction than nickel and/or having a desired electro-chemical potential.

In an embodiment the brazing product is elongated aluminium alloy stock, e.g. aluminium alloy sheet or strip, aluminium alloy wire or aluminium alloy rod.

An AA4xxx-series aluminium alloy sheet or strip having Si as the most important alloying element in the range of 2 to 18% by weight, more preferably 7 to 14%, can be plated on one or both surfaces with Ni or Ni-alloy, e.g. Ni—Bi alloy, and may be employed in subsequent brazing operations, in particular in an inert atmosphere brazing (CAB) operation in the absence of a brazing-flux material. In the AA4xxx-series alloy other alloying elements may be present to improve specific properties, the balance is made by impurities each up to 0.05 wt. %, total up to 0.20 wt. %, and aluminium. Iron may usually be present as impurity in an amount of up to 0.8 wt. %.

Also, aluminium alloy wire or rods being made of an AA4xxx-series alloy may be plated with a Ni or Ni-alloy layer having 90% or more of nickel, e.g. Ni—Bi alloy, and subsequently employed in a brazing operation, in particular in an inert atmosphere brazing (CAB) operation in the absence of a brazing-flux material, and may also be employed as weld filler wire or weld filler rod in a welding operation.

In a preferred embodiment the brazing product is a brazing sheet product comprising a core sheet made of an aluminium alloy. Coupled to at least one surface of the core sheet is an aluminium clad layer. The aluminium clad layer is made of an aluminium AA4xxx-series alloy comprising silicon in the range of 2 to 18% by weight, preferably in the range of 7 to 14%, and a layer comprising nickel or nickel-alloy having 90% or more of nickel on the outer surface of the aluminium clad layer such that taken together the aluminium clad layer and all layers exterior thereto form the filler metal for a brazing operation and whereby one or more elements have been added in the appropriate amounts to improve the corrosion performance of the brazing product. Unless otherwise indicated, all percentages in the present specification are weight percents.

In a further embodiment the aluminium alloy clad layer has a thickness ranging from about 2 to 20% of the total thickness of the total brazing product thickness. Typical aluminium clad layer thickness is in the range of 40 to 80 micron. The aluminium core sheet has a thickness typically in a range of at most 5 mm, more preferably in the range of 0.1 to 2 mm.

Preferably, in the brazing product according to the invention, the layer comprising nickel or nickel-alloy having 90% or more of nickel, e.g. Ni—Bi, has a thickness of at most 2.0 μm, preferably at most 1.0 μm, and more preferably at most 0.5 μm. A coating thickness of more than 2.0 μm requires a prolonged treatment time for plating, and may result in wrinkling of the molten filler metal during a subsequent brazing operation. A preferred minimum thickness for this nickel containing layer is about 0.25 μm. Also other techniques such as roll bonding, dipping, thermal spraying, CVD, PVD or other techniques for depositing of metals or metal alloys from a gas or vapor phase may be used. Preferably the nickel comprising layer is essentially lead-free.

In an embodiment, the brazing product according to the invention is further characterised by a thin layer comprising zinc or tin as an intermediate bonding layer between the outer surface of the AlSi-alloy clad layer and the layer comprising nickel or nickel-alloy. With the zinc or tin comprising intermediate bonding layer a very effective bond between the AlSi-alloy layer and the layer comprising nickel is formed, the bond remaining effective during subsequent deformation of the brazing product, for example in a bending operation. The most suitable methods of applying such an intermediate layer of tin or zinc are by means of direct or immersion plating. Preferably the applied intermediate bonding layer comprising zinc or tin has a thickness of at most 0.5 μm, more preferably at most 0.3 μm (300 nm), and most preferably in the range of 0.01 to 0.15 μm (10–150 nm). In the best results obtained a thickness of about 30 nm has been used. A coating thickness of greater than 0.5 μm is thought to have no further advantages for improving the adhesion.

In the brazing product according to the invention the core may be coupled to the aluminium clad layer via an intermediate layer, preferably as an anodic layer which may be any material which is anodic relative to the core, zinc or zinc-containing aluminium alloys being possible choices.

In a preferred embodiment the brazing product is elongated aluminium alloy stock, such as sheet, strip, wire or rod, resulting in e.g. brazing sheet products in accordance with the invention.

In a further aspect of the invention there is provided a method of manufacturing a brazed assembly using the brazing product, and ideally a brazing sheet product, in accordance with the invention comprising the sequential process steps of:

(a) shaping parts of which at least one is made from brazing product according to the invention;

(b) assembling the parts into the assembly;

(c) brazing the assembly under a vacuum or in an inert atmosphere in the absence of a brazing-flux at elevated temperature, preferably at a temperature in the range of 490 to 600° C. for a period long enough for melting and spreading of the molten filler;

(d) cooling the brazed assembly to below 100° C., typically with a cooling rate of at least 20° C./min.

Depending upon the aluminium alloy of the core the process may include the further processing step (e) of ageing the brazed and cooled assembly in order to optimise the mechanical and/or corrosion properties of the resultant assembly.

This achieves the effect that brazed assemblies can be provided having an improved corrosion resistance when measured in a SWAAT-test in accordance with ASTM G-85, and preferably having corrosion life of 12 days or more in a SWAAT-test without perforations in accordance with ASTM G-85.

In an embodiment of the method of manufacturing a brazed assembly in step (a) at least one of the parts to be joined by brazing is made of the brazing product in accordance with the invention set out above, ideally a brazing sheet product, and at least one other part is selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

The invention further provides a brazed assembly manufactured in accordance with the invention described above and wherein the parts made from the brazing product have a corrosion life of 12 days or more in a SWAAT-test without perforations in accordance with ASTM G-85.

In its preferred embodiment the brazed assembly is a heat exchanger, typically for automotive applications, or a (solid) fuel cell.

EXAMPLE

On a laboratory scale, tests were carried out on aluminium brazing sheets manufactured from an AA3003 core alloy clad on both sides with an AA4045 clad alloy, and having a total thickness of 0.5 mm and a clad layer thickness of 50 microns on both sides. The composition of standard AA4045 is, in weight percent:

Si 9.0–11.0
Fe <0.80
Cu <0.30
Mg <0.05
Zn <0.10
Ti <0.20
others each <0.05, total <0.15
balance aluminium.

The following sequential pre-treatment steps have been used for each sample:
- cleaning by immersion for 180 sec. at 50° C. in ChemTec 30014 (a commercially available bath), followed by rinsing,
- alkaline etching for 20 sec. at 50° C. in ChemTec 30203 (a commercially available bath), followed by rinsing,
- desmutting for 60 sec. at room temperature in an acidic oxidising solution, typically 50% nitric acid, followed by rinsing,
- zincate immersion using ChemTec 19023 (a commercially available zincate bath) for 60 sec. at room temperature resulting in a thin zinc layer having a thickness of about 30 nm and resulting in a Ni:Zn ratio of 10:<0.1 in the metal filler, followed by rinsing.

Following the pre-treatment one or two different layers of metal on both sides of the sheet material were applied by means of electroplating (see also Table 1), The aqueous Ni—Bi plating bath has the following composition:

| | |
|---|---|
| nickel sulphate | 142 g/l |
| nickel chloride | 30 g/l |
| sodium citrate | 140 g/l |
| sodium gluconate | 30 g/l |
| ammonium sulphate | 34 g/l |
| bismuth ions | 0.5 g/l |

In one variant of the samples, an extra high Bi-content was added to the Ni—Bi layer by using the same Ni—Bi plating bath, but having a bismuth ions concentration of 7.0 g/l.

The composition of the tin plating bath was as follows:

| | |
|---|---|
| Tin 2+-ions | 26.1 g/l |
| Fe total | 15.5 g/l |
| sulphate | 5.2 g/l |
| PSA | 210 g/l |

"PSA" stands for Phenol Sulfonic Acid.

For the Cu-layer two different baths have been used, namely a sulphate bath and a pyrophosphate bath. The composition of the sulphate bath ("SUL") was Cu-sulphate 120 g/l and sulphuric acid (97%) 75 g/l. The composition of the pyrophosphate bath ("PYR") was as follows:

| | |
|---|---|
| Cu-pyrophosphate | 75 g/l |
| K-pyrophosphate | 300 g/l |
| ammonia (25%) | 3 g/l |
| citric acid | 11 g/l |

For the zinc plating bath the commercial available ENVI-ROZIN 120 (trade name) has been used, and having the following composition:

| | |
|---|---|
| zinc oxide | 15.0 g/l |
| sodium hydroxide | 130 g/l |
| conditioner (25472) | 30 ml/l |
| initial brightener (25453) | 6 ml/l |

The plated specimens have been tested for adhesion using the Erichsen dome test (5 mm), and the T-bend test. A value assessment is then given to the adhesion where (−) =poor, (±)=fair, and (+)=good. The results obtained are summarised in Table 1.

Prior to the assessment of the post-braze corrosion resistance, the samples have been subjected to a simulated brazing cycle. The samples were heated under flowing nitrogen, with heating from room temperature to 580° C., dwell time at 580° C. for 1 minute, cooling from 580° C. to room temperature. All samples had a good or even excellent brazeability. Following the brazing cycle either two or three samples of each type of plated brazing sheet have been tested in a SWAAT until the first perforations expressed in days of testing appear according to ASTM G-85, and the individual results are given in Table 1. The samples having no perforations after 21 days were taken out of the SWAAT box, and reported as ">21" in Table 1.

As a reference it is mentioned that typically aluminium brazing sheets manufactured from an AA3003 core alloy clad on both sides with an AA4045 clad alloy, and having a total thickness of 0.5 mm and a clad layer thickness of 50 microns each and devoid of any further metal layers have a SWAAT-test performance of more than 21 days without perforations.

From the results of Table 1 it can be seen that Sample 1 is a brazing product known from the prior art and having a layer comprising nickel with a small addition of bismuth as an alloying element. The SWAAT-test results for three samples tested are all 7 days before the perforations occur. By significantly increasing the Bi-level in the nickel layer, see Sample 2, the post-braze corrosion performance is significantly improved. Samples 3 and 4 have a first Ni—Bi layer similar to that of Sample 1, but these two samples have in addition a second thin electroplated layer of tin such that the mol-ratio Ni:Sn in the metal filler is 10:2 and 10:1 respectively. The addition of a small amount of tin to the metal filler remarkably results in an important improvement of the post-braze corrosion performance.

The application of a thin copper layer may also improve the corrosion performance of the brazing product, see e.g. Samples 6, 7, 9, 10 and 11. From Samples 10 and 11 it can be seen that the copper layer can be applied also underneath the nickel layer instead of on top of it. The use of copper does not necessarily always result in better corrosion performance, see, e.g., Sample 5. From Sample 8 it can be seen that too much copper will adversely affect the corrosion performance. From a comparison of Samples 7 and 9 it be seen that the thin copper layer may be applied from different plating baths, while still resulting in similar corrosion performance.

From Samples 12 to 14 it can be seen that the application of a thin zinc layer, other than as a 30 nm bonding layer, in various Ni:Zn ratio's result in an improved post-braze corrosion performance also.

Furthermore, it can be seen from Table 1 that the application of an additional separate metal layer does not adversely affect the adhesion of the nickel layer, or any of the other applied metal layers.

Having now fully described the invention, it will be apparent to one of ordinary skill in the art that many changes and modifications can be made without departing from the spirit or scope of the invention as herein described.

TABLE 1

| Sample | Composition first layer (g/m$^2$) | | Composition second layer (g/m$^2$) | | Mol-ratio Ni:element | Adhesion | SWAAT |
|---|---|---|---|---|---|---|---|
| 1  | Ni 3.7  | Bi 0.09 |    | —         | Ni:Bi ≈ 10:0.07 | + | 7, 7, 7      |
| 2  | Ni 3.49 | Bi 1.59 |    | —         | Ni:Bi ≈ 10:1.3  | + | 12, 14, 21   |
| 3  | Ni 3.72 | Bi 0.09 | Sn | 1.84      | Ni:Sn ≈ 10.2.6  | + | 19, >21, >21 |
| 4  | Ni 3.75 | Bi 0.09 | Sn | 0.97      | Ni:Sn ≈ 10:1.3  | + | 17, >21, >21 |
| 5  | Ni 3.46 | Bi 0.08 | Cu 4.49  (via SUL) | Ni:Cu ≈ 10:12   | + | 6, 7, 7      |
| 6  | Ni 3.43 | Bi 0.08 | Cu 1.15  (via SUL) | Ni:Cu ≈ 10:3.1  | + | 14, 17, >21  |
| 7  | Ni 3.33 | Bi 0.08 | Cu 0.63  (via SUL) | Ni:Cu ≈ 10:1.7  | + | >21, >21, >21 |
| 8  | Ni 3.39 | Bi 0.09 | Cu 32.8  (via PYR) | Ni:Cu ≈ 10:90   | + | 3, 3, 7      |
| 9  | Ni 3.64 | Bi 0.09 | Cu 0.66  (via PYR) | Ni:Cu ≈ 10:1.7  | + | 17, >21      |
| 10 | Cu 1.27 (via PYR) | Ni 3.66 | Bi 0.08 | Ni:Cu ≈ 10:3.2 | + | 11, 13, 14 |
| 11 | Cu 0.59 (via PYR) | Ni 3.43 | Bi 0.08 | Ni:Cu ≈ 10:1.6 | + | 17, 11 |
| 12 | Zn 3.72 |         | Ni 3.34 | Bi 0.10 | Ni:Zn ≈ 10:10 | + | 10, 10, 11  |
| 13 | Zn 0.91 |         | Ni 3.73 | Bi 0.11 | Ni:Zn ≈ 10:2.2 | + | 10, 17, >21 |
| 14 | Zn 0.53 |         | Ni 3.65 | Bi 0.11 | Ni:Zn ≈ 1.3   | + | 10, 17      |

What is claimed is:

1. A brazing product comprising:
an aluminium layer (1) made of an aluminium alloy comprising silicon in an amount in the range of 2 to 18% by weight, and a layer (2) comprising nickel on an outer surface of said aluminium layer (1), wherein taken together said aluminium layer (1) and all layers exterior thereto form a filler metal for a brazing operation, wherein the filler metal has a composition containing at least one element with a smaller exchange current density for the Hydrogen Evolution Reaction than nickel, and wherein the mol-ratio of Ni to the total of said at least one element is in the range of 10:(0.3 to 30).

2. A brazing product according to claim 1, wherein the at least one element is selected from at least one member of the group consisting of tin, bismuth, zinc, silver, indium, lead, antimony, magnesium, cadmium, and gallium.

3. A brazing product according to claim 1, wherein there is provided a separately applied layer (3) comprising said at least one element in an amount such that in the filler metal the mol-ratio of Ni to the total of said at least one element is in the range of 10:(0.3 to 30).

4. A brazing product according to claim 3, wherein the separately applied layer (3) is a plated layer or a thermal sprayed layer.

5. A brazing product according to claim 1, wherein there is provided a separately applied layer (3) comprising tin in an amount such that in the filler metal the mol-ratio of Ni:Sn is in the range of 10:(0.5 to 9).

6. A brazing product according to claim 1, wherein the brazing product is elongated aluminium alloy stock.

7. A brazing product according to claim 6, wherein the elongated aluminium alloy stock is a member of the group consisting of sheet and strip.

8. A brazing product according to claim 6, wherein the brazing product is a brazing sheet product comprising a core sheet (5) made of an aluminium alloy, at least one surface of said core sheet coupled to said aluminium layer (1), said aluminium layer (1) being an aluminium clad layer (1), the aluminium clad layer being made of said aluminium alloy comprising silicon in an amount in the range of 2 to 18% by weight, and said layer (2) comprising nickel on the outer surface of said aluminium clad layer such that taken together said aluminium clad layer and all layers exterior thereto form the filler metal for a brazing operation.

9. A brazing product according to claim 6, wherein there is a layer (6) comprising zinc or tin as an intermediate bonding layer between said outer surface of said aluminium layer (1) comprising silicon in the range of 2 to 18% and said layer comprising nickel (2) and having a thickness of less than 1 micron.

10. A brazing product according to claim 8, wherein there is a layer (6) comprising zinc or tin as an intermediate bonding layer between said outer surface of said aluminium layer (1) comprising silicon in the range of 2 to 18% and said layer comprising nickel (2) and having a thickness of less than 1 micron.

11. A brazing product according to claim 1, wherein the brazing product has a post-braze corrosion life of 8 days or more in a SWAAT-test without perforations in accordance with ASTM G-85.

12. A brazing product according to claim 1, wherein the brazing product has a post-braze corrosion life of 12 days or more, in a SWAAT-test without perforations in accordance with ASTM G-85.

13. A brazing product according to claim 8, wherein the brazing product has a post-braze corrosion life of 8 days or more in a SWAAT-test without perforations in accordance with ASTM G-85.

14. A brazing product according to claim 8, wherein the brazing product has a post-braze corrosion life of 12 days or more, in a SWAAT-test without perforations in accordance with ASTM G-85.

15. A brazing product having an aluminium layer (1) made of an aluminium alloy comprising silicon in an amount in the range of 2 to 18% by weight, and a layer (2) comprising nickel on the outer surface of said aluminium layer (1), wherein taken together said aluminium layer (1) and all layers exterior thereto form the filler metal for a brazing operation, wherein the filler metal has a composition containing at least one element having an electro-chemical potential such that the electro-chemical potential difference between Ni-aluminides particles and the aluminium alloy matrix of the filler composition is reduced relative to an aluminium alloy matrix from a composition which is the same as the filler composition except for lacking said at least one element, and wherein the mol-ratio of Ni to the total of said at least one element is in the range of 10:(0.3 to 30).

16. A brazing product according to claim 15, wherein there is provided a separately applied layer (3) comprising said at least one element in an amount such that in the filler metal the mol-ratio of Ni to the total of said at least one element is in the range of 10:(0.3 to 30).

17. A brazing product according to claim 16, wherein the separately applied layer (3) is a plated layer or a thermal sprayed layer.

18. A brazing product according to claim 15, wherein there is provided a separately applied layer (4) comprising copper in an amount such that in the filler metal the mol-ratio of Ni:Cu is in the range of 10:(0.5 to 9).

19. A brazing product according to claim 18, wherein the separately applied layer (4) is a plated layer or a thermal sprayed layer.

20. A brazing product according to claim 15, wherein the brazing product is elongated aluminium alloy stock.

21. A brazing product according to claim 20, wherein the elongated aluminium alloy stock is a member of the group consisting of sheet and strip.

22. A brazing product according to claim 20, wherein the brazing product is a brazing sheet product comprising a core sheet (5) made of an aluminium alloy, at least one surface of said core sheet coupled to said aluminium layer (1), said aluminium layer (1) being an aluminium clad layer (1), the aluminium clad layer being made of said aluminium alloy comprising silicon in an amount in the range of 2 to 18% by weight, and said layer (2) comprising nickel on the outer surface of said aluminium clad layer such that taken together said aluminium clad layer and all layers exterior thereto form the filler metal for a brazing operation.

23. A brazing product according to claim 20, wherein there is a layer (6) comprising zinc or tin as an intermediate bonding layer between said outer surface of said aluminium layer (1) comprising silicon in the range of 2 to 18% and said layer comprising nickel (2) and having a thickness of less than 1 micron.

24. A brazing product according to claim 22, wherein there is a layer (6) comprising zinc or tin as an intermediate bonding layer between said outer surface of said aluminium layer (1) comprising silicon in the range of 2 to 18% and said layer comprising nickel (2) and having a thickness of less than 1 micron.

25. A brazing product according to claim 15, wherein the brazing product has a post-braze corrosion life of 8 days or more in a SWAAT-test without perforations in accordance with ASTM G-85.

26. A brazing product according to claim 15, wherein the brazing product has a post-braze corrosion life of 12 days or more, in a SWAAT-test without perforations in accordance with ASTM G-85.

27. A brazing product according to claim 22, wherein the brazing product has a post-braze corrosion life of 8 days or more in a SWAAT-test without perforations in accordance with ASTM G-85.

28. A brazing product according to claim 22, wherein the brazing product has a post-braze corrosion life of 12 days or more, in a SWAAT-test without perforations in accordance with ASTM G-85.

29. Method of manufacturing an assembly of brazed components, comprising the steps of:
(a) shaping parts of which at least one of the parts is made from the brazing product according to claim 1;
(b) assembling the parts into the assembly;
(c) brazing the assembly under a vacuum or in an inert atmosphere in the absence of a brazing-flux at elevated temperature for a period long enough for melting and spreading of the molten filler metal;
(d) cooling the brazed assembly.

30. The method of claim 29, wherein in step (a) said at least one of the parts to be joined by brazing is a brazing sheet product.

31. The method of claim 29, wherein in step (a) at least one other of said parts comprises a material selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

32. A brazed assembly manufactured in accordance with claim 29, and wherein the parts made from said brazing product have a post-braze corrosion life of 12 days or more in a SWAAT-test without perforations in accordance with ASTM G-85.

33. Method of manufacturing an assembly of brazed components, comprising the steps of:
(a) shaping parts of which at least one is made from the brazing product according to claim 8;
(b) assembling the parts into the assembly;
(c) brazing the assembly under a vacuum or in an inert atmosphere in the absence of a brazing-flux at elevated temperature for a period long enough for melting and spreading of the molten filler metal;
(d) cooling the brazed assembly.

34. The method of claim 33, wherein in step (a) said at least one of the parts to be joined by brazing is a brazing sheet product.

35. The method of claim 33, wherein in step (a) at least one other of said parts comprises a material selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

36. A brazed assembly manufactured in accordance with claim 33, and wherein the parts made from said brazing product have a post-braze corrosion life of 12 days or more in a SWAAT-test without perforations in accordance with ASTM G-85.

37. Method of manufacturing an assembly of brazed components, comprising the steps of:
(a) shaping parts of which at least one is made from the brazing product according to claim 15;
(b) assembling the parts into the assembly;
(c) brazing the assembly under a vacuum or in an inert atmosphere in the absence of a brazing-flux at elevated temperature for a period long enough for melting and spreading of the molten filler metal;
(d) cooling the brazed assembly.

38. The method of claim 37, wherein in step (a) said at least one of the parts to be joined by brazing is a brazing sheet product.

39. The method of claim 37, wherein in step (a) at least one other of said parts comprises a material selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

40. A brazed assembly manufactured in accordance with claim 37, and wherein the parts made from said brazing product have a post-braze corrosion life of 12 days or more in a SWAAT-test without perforations in accordance with ASTM G-85.

41. Method of manufacturing an assembly of brazed components, comprising the steps of:
   (a) shaping parts of which at least one is made from the brazing product according to claim 22;
   (b) assembling the parts into the assembly;
   (c) brazing the assembly under a vacuum or in an inert atmosphere in the absence of a brazing-flux at elevated temperature for a period long enough for melting and spreading of the molten filler metal;
   (d) cooling the brazed assembly.

42. The method of claim 41, wherein in step (a) said at least one of the parts to be joined by brazing is a brazing sheet product.

43. The method of claim 41, wherein in step (a) at least one other of said parts comprises a material selected from the group consisting of titanium, plated or coated titanium, bronze, brass, stainless steel, plated or coated stainless steel, nickel, nickel-alloy, low-carbon steel, plated or coated low-carbon steel, high-strength steel, and plated or coated high-strength steel.

44. A brazed assembly manufactured in accordance with claim 41, and wherein the parts made from said brazing product have a post-braze corrosion life of 12 days or more in a SWAAT-test without perforations in accordance with ASTM G-85.

* * * * *

UNITED STATES PATENT AND TRADEMARK OFFICE
CERTIFICATE OF CORRECTION

PATENT NO. : 6,796,484 B2  Page 1 of 1
DATED : September 28, 2004
INVENTOR(S) : Adrianus Jacobus Wittebrood et al.

It is certified that error appears in the above-identified patent and that said Letters Patent is hereby corrected as shown below:

<u>Title page,</u>
Item [75], Inventors, the second inventor is -- Jacques Hubert Olga Joseph Wijenberg , Bogortuin 135, 1019 PH Amsterdam, Netherlands --

Signed and Sealed this

Twenty-third Day of November, 2004

JON W. DUDAS
*Director of the United States Patent and Trademark Office*